(12) United States Patent
Speker et al.

(10) Patent No.: US 11,565,348 B2
(45) Date of Patent: Jan. 31, 2023

(54) METHODS AND SYSTEMS FOR JOINING AT LEAST TWO WORKPIECES

(71) Applicant: TRUMPF Laser- und Systemtechnik GmbH, Ditzingen (DE)

(72) Inventors: Nicolai Speker, Pleidelsheim (DE); Johannes Seebach, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 120 days.

(21) Appl. No.: 16/739,658

(22) Filed: Jan. 10, 2020

(65) Prior Publication Data
US 2020/0147723 A1 May 14, 2020

Related U.S. Application Data

(63) Continuation of application No. PCT/EP2018/068499, filed on Jul. 9, 2018.

(30) Foreign Application Priority Data

Jul. 13, 2017 (DE) .......................... 102017211982.9

(51) Int. Cl.
*B23K 26/26* (2014.01)
*B23K 26/24* (2014.01)
(Continued)

(52) U.S. Cl.
CPC .............. *B23K 26/26* (2013.01); *B23K 26/08* (2013.01); *B23K 26/082* (2015.10); *B23K 26/0884* (2013.01); *B23K 26/24* (2013.01)

(58) Field of Classification Search
CPC ...... B23K 26/24; B23K 26/242; B23K 26/26; B23K 26/08
(Continued)

(56) References Cited

U.S. PATENT DOCUMENTS 4,150,329 A * 4/1979 Dahlstrom ............. G05B 19/41
700/86
4,621,333 A * 11/1986 Watanabe ............. G05B 19/41
700/250
(Continued)

FOREIGN PATENT DOCUMENTS

CN 102091889 6/2011
CN 103056533 A 4/2013
(Continued)

OTHER PUBLICATIONS

Machine English translation of JP-H1071480-A (Year: 1998).*
(Continued)

*Primary Examiner* — Sang Y Paik
*Assistant Examiner* — Erwin J Wunderlich
(74) *Attorney, Agent, or Firm* — Fish & Richardson P.C.

(57) ABSTRACT

The disclosure relates to methods and systems for joining at least two workpieces, including forming a weld joint by moving a machining beam, e.g., a laser beam, and the at least two workpieces relative to one another along a feed direction, wherein the movement of the machining beam and the two workpieces relative to one another is superimposed with a periodic movement in a movement path, e.g., a two-dimensional movement path, which extends in a transverse direction perpendicularly to the feed direction and, e.g., additionally in the feed direction. The movement path has, between two reversal points in the transverse direction, at least one stop point at which a speed component of the periodic movement in the transverse direction is zero. The invention also relates to computer program products and systems for carrying out the methods.

18 Claims, 3 Drawing Sheets

(51) Int. Cl.
    *B23K 26/08*         (2014.01)
    *B23K 26/082*      (2014.01)

(58) Field of Classification Search
    USPC .................................................. 219/121.64
    See application file for complete search history.

(56) References Cited

U.S. PATENT DOCUMENTS

| | | | | |
|---|---|---|---|---|
| 5,582,750 | A * | 12/1996 | Hamura | B23K 9/1274 219/124.34 |
| 6,740,845 | B2 | 5/2004 | Martukanitz et al. | |
| 8,965,556 | B2 * | 2/2015 | Oe | B23K 26/082 372/24 |
| 9,566,664 | B2 | 2/2017 | Roos et al. | |
| 10,300,664 | B2 | 5/2019 | Knoll et al. | |
| 10,337,335 | B2 * | 7/2019 | Pavlov | B23K 26/342 |
| 10,807,191 | B2 * | 10/2020 | Nakagawa | B23K 26/244 |
| 10,875,121 | B2 * | 12/2020 | Roos | B23K 26/0626 |
| 11,148,232 | B2 * | 10/2021 | Strebel | B23K 26/032 |
| 2005/0230364 | A1 | 10/2005 | Wang et al. | |
| 2007/0084835 | A1 * | 4/2007 | Dinauer | B23K 26/26 219/121.64 |
| 2014/0054273 | A1 | 2/2014 | Behmlander et al. | |
| 2016/0354867 | A1 * | 12/2016 | Matsuoka | B23K 26/0876 |
| 2017/0368637 | A1 * | 12/2017 | Giese | B23K 15/004 |
| 2018/0021888 | A1 * | 1/2018 | Liu | B23K 26/082 219/121.64 |
| 2018/0269459 | A1 | 9/2018 | Tsuchiya et al. | |
| 2019/0047073 | A1 * | 2/2019 | Shika | B25J 17/025 |
| 2019/0255660 | A1 * | 8/2019 | Mori | B23K 26/0652 |
| 2020/0023461 | A1 * | 1/2020 | Galbraith | B23K 26/064 |
| 2020/0180077 | A1 * | 6/2020 | Riquelme | B23K 26/0093 |
| 2020/0215635 | A1 * | 7/2020 | Peters | B23K 37/0252 |
| 2020/0376598 | A1 * | 12/2020 | Watanabe | B23K 26/083 |
| 2020/0398373 | A1 * | 12/2020 | Rataj | B23K 26/0643 |
| 2021/0394305 | A1 * | 12/2021 | Funami | B23K 26/0665 |

FOREIGN PATENT DOCUMENTS

| | | | | |
|---|---|---|---|---|
| CN | 104439702 | | 3/2015 | |
| CN | 104999179 | | 10/2015 | |
| CN | 106414037 | | 2/2017 | |
| DE | 102012008940 | A1 | 11/2013 | |
| DE | 102013110523 | A1 * | 3/2015 | .......... B23K 26/082 |
| DE | 102013110523 | A1 | 3/2015 | |
| DE | 102013219220 | A1 | 3/2015 | |
| DE | 102014206302 | A1 | 10/2015 | |
| DE | 102014210118 | A1 | 12/2015 | |
| DE | 102014015094 | A1 | 4/2016 | |
| DE | 102016107581 | B3 * | 4/2017 | .......... B23K 26/244 |
| EP | 1534460 | B2 | 8/2016 | |
| JP | H1071480 | A * | 3/1998 | .......... B23K 26/244 |
| JP | H 1071480 | A | 3/1998 | |
| JP | 2017-098565 | | 6/2017 | |
| JP | 2010-264494 | | 11/2021 | |
| KR | 1020170025997 | | 3/2017 | |
| WO | WO 2013/167240 | A1 | 11/2013 | |
| WO | WO 2017/035729 | | 3/2017 | |
| WO | WO 2016/194322 | | 4/2018 | |
| WO | WO 2019/011838 | A1 | 1/2019 | |

OTHER PUBLICATIONS

Machine English translation of DE-102013110523-A1 (Year: 2015).*
Machine English translation of DE-102016107581-B3 (Year: 2017).*
DE Office Action in German Appln. No. 102017211982, dated Jun. 29, 2018, 13 pages (with English translation).
Kraetzsch et al., "Laser Beam Welding with High-Frequency Beam Oscillation: Welding of Dissimilar Materials with Brilliant Fiber Lasers," Physics Procedia, Jan. 2011, 12:142-149.
PCT International Preliminary Report on Patentability in International Appln. No. PCT/EP2018/068499, dated Jan. 14, 2020, 14 pages (with English translation).
PCT International Search Report and Written Opinion in International Appln. No. PCT/EP2018/068499, dated Oct. 29, 2018, 17 pages (with English translation).
Stritt, "Process strategies for the prevention of heat cracks during remote laser beam swelling of AlMgSi 6016," Thesis for the Faculty of Design, Production and Vehicle Technology at the University of Stuttgart, 2015, 34 pages (with English translation).
CN Office Action in Chinese Appln. No. 201880046634.7, dated Apr. 16. 2021, 11 pages (with English translation).
KR Office Action in Korean Appln. No. 10-2020-7000749, dated Jul. 27, 2021, 10 pages (with English translation).
JP Japanese Office Action in Japanese Appln. No. 2019-569237, dated Sep. 6, 2021, 15 pages (with English translation).

* cited by examiner

METHODS AND SYSTEMS FOR JOINING AT LEAST TWO WORKPIECES

CROSS REFERENCE TO RELATED APPLICATIONS

This application is a continuation of and claims priority under 35 U.S.C. § 120 from PCT Application No. PCT/EP2018/068499, filed on Jul. 9, 2018, which claims priority from German Application No. DE 10 2017 211 982.9, filed on Jul. 13, 2017. The entire contents of each of these priority applications are incorporated herein by reference.

TECHNICAL FIELD

The present disclosure relates to methods and systems for joining at least two workpieces.

BACKGROUND

When joining two or more workpieces using a machining beam, for example a laser beam, hot cracks can occur when welding and full-penetration welding takes place at lap joints and/or at fillet joints, in particular in the case of materials which are susceptible to hot cracking or geometries of the weld joint which are susceptible to cracking. To prevent hot cracks and therefore to improve the welding result, it is known to superimpose a periodic oscillating movement in a one- or two-dimensional movement path on the feed movement along the weld joint.

For example, a method for lap welding metal parts has become known from EP 1 534 460 B2, in which a laser beam is moved in a first direction along a contact surface between a pair of metal parts and a swinging of the laser beam takes place in a second direction which deviates from the first direction. The laser beam is a circular laser beam spot, which can swing transversely to the first direction. The laser beam spot can swing in a linear path. The laser beam spot can also swing in a circular path or in an elliptical path.

In DE 10 2014 206 302 A1, a method for welding is described, in which an energy source is moved in intersecting, in particular fully arcuately progressing paths with respect to the surface of a substrate. The arcuately progressing paths can be in the form of loops, wherein an upper loop corresponds to the upper part of a figure eight-shaped path and a lower loop corresponds to the lower part of a figure eight-shaped path.

Optics with a movable inner housing for welding with oscillating beams and an associated welding method have become known from DE 10 2014 210 118 A1. By means of the optics, an oscillating movement of the laser beam on the surface can be achieved, wherein triangular weaving movements or loop-shaped weaving movements can be generated.

In DE 10 2013 219 220 A1, a method for laser remote machining of a workpiece at a fillet and an associated apparatus are described, in which a laser beam is directed onto and guided over the component by means of a scanner apparatus, wherein the working region of the laser beam is illuminated with illuminating radiation and wherein the illuminating radiation is directed onto the component at an angle of incidence which is adjusted depending on the fillet geometry of the component.

DE 10 2013 110 523 A1 describes an apparatus and a method for joining workpieces by means of a laser beam, wherein the laser beam carries out a first oscillating movement with a first oscillating frequency and a second oscillating movement, superimposed on the first oscillating movement, with a second, higher oscillating frequency.

DE 10 2014 015 094 A1 describes a method for laser beam welding partners to be joined, in which the machining laser beam moves along an optically detected tracking edge according to an intended weld joint progression. The optical joint tracking is superimposed with a high-frequency oscillating mirror oscillation of at least one oscillating mirror, which oscillating mirror oscillation is adapted to the component geometry and/or procedural conditions. The spatial oscillating mirror oscillation can be controlled in such a way that, in addition to the movement along the intended progression of the weld joint, the laser beam impingement point executes a superimposed oscillating transversal movement and/or a superimposed oscillating wobbling movement, in particular an oscillating circular movement.

In DE 10 2012 008 940 A1, a method and a device for joining workpieces are described, in which the movement of the laser beam in the feed direction is superimposed with a second movement having an oscillating movement component both in the feed direction and perpendicularly thereto.

In JPH1071480 A, a laser beam welding method at the lap joint is described, in which a scanner movement of an optical axis of the laser beam takes place along a two-dimensional locus. In the case of a scanner movement in a circular or elliptical pattern, the positional region of the overlap of the optical axis of the laser beam can be limited to a predetermined region.

The article "Laser Beam Welding with High-Frequency Beam Oscillation: Welding of Dissimilar Materials with Brilliant Fiber Lasers," M. Kraetzsch et al., Physics Procedia 12 (2011) 142-149, describes that a laser beam source can be used in combination with a high-frequency beam oscillation to weld metal material combinations which were hitherto not laser-weldable in a conventional manner, for example the material combination Al—Cu.

The dissertation "Prozessstrategien zur Vermeidung von Heißrissen beim Remote-Laserstrahlschweißen von AlMgSi 6016" [Process strategies for preventing hot cracks during remote laser beam welding of AlMgSi 6016] by Peter Stritt, describes approaches for laser beam welding of aluminum that are intended to prevent hot cracks close to the edges without the use of a filler metal. Welding using a modulated laser power is described as one option for reducing the tendency towards hot cracking. Another option consists in a step strategy in which short step joints are spatially superimposed with a time offset in such a way that the end region, which is susceptible to end crater cracks, is over-welded again.

SUMMARY

The disclosure is based on the object of providing methods and systems to improve the connection between at least two workpieces to be joined.

In a first aspect, the disclosure provides methods including forming a weld joint by moving a machining beam, in particular a laser beam, and at least two workpieces relative to one another along a feed direction, wherein the movement of the machining beam and the two workpieces relative to one another is superimposed with a periodic movement in a preferably two-dimensional movement path, which extends in a transverse direction perpendicularly to the feed direction and preferably additionally in the feed direction.

In another aspect, the disclosure also provides associated systems that include a machining head for aligning a machining beam, in particular a laser beam, with the two workpieces, a movement device for moving the machining beam and the at least two workpieces relative to one another along a feed direction to form a weld joint, a beam deflecting device for deflecting the machining beam, and a control device for controlling the beam deflecting device and/or the movement device for generating a periodic movement of the machining beam, superimposed on the relative movement between the machining beam and the two workpieces in the feed direction, along a preferably two-dimensional movement path, which extends in a transverse direction perpendicularly to the feed direction and preferably additionally in the feed direction.

This object is achieved according to one aspect by methods of the type described herein, in which the movement path between two reversal points in the transverse direction has at least one stop point, at which a speed component of the periodic movement in the transverse direction is zero.

To improve the connection, in particular to prevent or inhibit the formation of hot cracks in workpieces made from materials susceptible to hot cracking, e.g., aluminum, and/or in geometries of the weld joint that are susceptible to hot cracking, it is advantageous to select an oscillating geometry of the periodic movement superimposed on the movement in the feed direction, which, in addition to the two reversal points of the trajectory of the periodic movement in the transverse direction, has at least one stop point at which a speed component of the periodic movement in the transverse direction is zero.

A movement reversal of the machining beam takes place at the two reversal points in the transverse direction with a change in the sign of the speed component in the transverse direction, i.e., from a positive sign to a negative sign or vice versa, so that, at the reversal point, the speed component in the transverse direction is necessarily zero, at least for an infinitesimally small time period. As a result of the additional stop point between the two reversal points in the transverse direction, i.e., in the lateral direction, a targeted positive change in the interaction time between the material of the workpieces and the machining beam can take place, in particular in the case of highly dynamic scanner welding processes. In addition, at the stop point, a speed component of the periodic movement in the feed direction can be zero or reduced to zero.

The periodic movement along the (possibly two-dimensional) movement path is generally executed by the machining beam which, to this end, is deflected with the aid of a beam deflecting device, for example in the form of a scanner device which, to this end, can have, for example, two scanner mirrors that are rotatable about a respective axis of rotation. The beam deflecting device can be moved relative to the static workpieces, for example, with the aid of a robot or the like to bring about the relative movement in the feed direction. Alternatively, in the case of a static machining beam, the relative movement and the superimposed periodic movement can also be realized by a (possibly two-dimensional) movement of the workpieces alone. A one-dimensional movement of the workpiece and a (superimposed) one-dimensional movement of the machining beam (typically perpendicularly to the movement of the workpiece) are also possible.

In the simplest case, the periodic movement is a movement with a one-dimensional movement path in the form of a line that progresses merely in the transverse direction, i.e., perpendicularly to the feed direction. In this case, the periodic movement can take place in the form of a conventional, sinusoidal oscillating movement, which additionally has a stop point in the transverse direction, at which the speed component in the transverse direction is zero.

The periodic movement is, for example, a movement both in the transverse direction, i.e., perpendicular to the feed direction, and in the feed direction, so that the machining beam progresses along a two-dimensional movement path. Within the context of this application, a periodic movement is to be understood such that the one- or two-dimensional movement path of the superimposed movement is self-contained. The movement path can have path sections that are passed through twice in the opposite direction. The movement path can optionally have one or more intersection points, from which two or more loops extend. However, it is generally advantageous if the two-dimensional movement path has no intersection points, for example, in the geometrical center of the movement path, as is the case, for example, for a movement path in the form of a figure eight.

In an advantageous variant, a non-continuous change in direction of the—in this case two-dimensional—movement path takes place at the at least one stop point. Within the context of this invention, a non-continuous change in direction is understood to be a kink in the two-dimensional movement path, i.e., a non-continuous change in the direction of the speed vector of the periodic movement along the movement path takes place at the stop point. The non-continuous change in direction of the speed vector does not necessarily need a change of sign of one or both speed components in the transverse direction or in the feed direction. For example, the movement path can have a path section that runs into the stop point with a speed vector that progresses in the transverse direction, i.e., which does not have a speed component in the feed direction, or vice versa.

In a further variant, the stop point of the periodic movement is positioned on a joint center of the weld joint. When welding fillet joints on aluminum workpieces, it has been shown, for example, that, by introducing the stop point in the joint center, an increase in the molten material volume in the joint center can be achieved, which, amongst other things, has a positive influence on the mechanically effective connecting surface. The positioning of the stop point in the joint center of the weld joint therefore has a positive influence on the welding result in terms of a considerable improvement in the connection between the two workpieces. In this variant, the stop point of the periodic movement is located typically centrally between the two reversal points in the transverse direction.

The relative movement of the machining beam and the two workpieces with respect to one another can be controlled or programed, for example, such that the machining beam is moved without the superimposed periodic movement along the joint center of the weld joint in the feed direction. In this case, the stop point of the periodic movement is typically located centrally between the two reversal points in the transverse direction (see above). However, a (generally slight) lateral offset between the stop point and the center can also be selected between the two reversal points.

During the relative movement, the feed direction can remain constant over time, so that a linear weld joint is formed; however, it is also possible that the relative movement follows a curved trajectory, so that the weld joint has a non-linear progression. In this case, the feed direction describes the current direction of the weld joint, i.e., the current direction of the relative movement between the machining beam and the two workpieces (without the superimposed periodic movement).

In a further variant, the stop point forms a front reversal point, in the feed direction, of the periodic movement along the two-dimensional movement path. In particular, the use of a stop point which forms a front reversal point, in the feed direction, of the periodic movement along the movement path has proven favorable since it enables a targeted influence of the welding process in the feed direction. It is alternatively or additionally likewise optionally possible that the one or a further stop point forms a rear reversal point, in the feed direction, of the periodic movement.

In a further variant, the two-dimensional movement path has two arc-shaped, in particular circular-arc-shaped, path sections, which contact one another at the stop point, wherein the two arc-shaped path sections, upon reaching the stop point, exclusively have a speed component (with a different sign) in the feed direction. In other words, the two arc-shaped path sections of the two-dimensional movement path run into the stop point with a speed vector tangential to the feed direction. It is thus achieved that the speed component of the periodic movement in the transverse direction is necessarily zero at the stop point. At the same time, the machining beam at the stop point, more precisely directly prior to or after reaching the stop point, has a speed component other than zero in the feed direction, which enables a targeted influence of the welding process in the feed direction, typically along the joint center. The use of arc-shaped path sections in the form of circular arcs has been shown to be advantageous for this purpose, although the arc-shaped path sections can also have an elliptical or other types of geometry or curvature. The two-dimensional trajectory can, in some embodiments, exclusively consist of the two arc-shaped path sections that contact one another at the stop point.

In a further development, the movement path has a further arc-shaped, e.g., semi-circular, path section, which connects two end points, remote from the stop point, of the two arc-shaped path sections to one another. The two end points of the further (circular-) arc-shaped path section form the reversal points of the movement path in the transverse direction and are connected to one another by the arc-shaped path section. As a result of the further (circular-) arc-shaped path section, it can be achieved that the movement path has no path sections that are passed through twice (in mutually opposite directions). With the aid of the circular-arc-shaped path section, the weld joint can be traversed with an optionally low power to generate dissociation effects in the molten material or to homogenize the weld joint.

In a further variation, the two-dimensional movement path in the transverse direction progresses symmetrically or asymmetrically with respect to a center axis progressing in the feed direction, e.g., containing the stop point. The movement path of the periodic movement can progress mirror-symmetrically with respect to the center axis, which forms the center between the two reversal points in the transverse direction and on which the stop point can be positioned. However, it is also possible for the movement path to progress asymmetrically with respect to the center axis between the two reversal points in the transverse direction. In the case of a two-dimensional movement path that progresses asymmetrically with respect to the center axis, it is possible to specifically control how much power is introduced into each of the two components. The greater the portion of the movement path in one half of the weld joint or the further the movement path is remote from the center axis in this half, the less strongly the component located beneath the other half of the weld joint is influenced by the portion of the movement path located in this half. Portions of the movement path that progress on the center axis or near to the center axis have a stronger influence on both components due to the heat conduction in the components or in the molten material. The selection of a suitable symmetrical or asymmetrical geometry therefore also depends on the joint type. With a movement path that progresses asymmetrically with respect to the center axis, the molten material volume transversely to the center axis or to the feed direction can be targeted more specifically towards high molten material volumes when a certain width (oscillation width) of the weld joint is required.

In a further variation, the two-dimensional movement path has a first and a second stop point, wherein the first stop point forms a reversal point in the feed direction of the periodic movement along the two-dimensional movement path, and wherein the second stop point is, for example, connected to the first stop point by a linear path section of the movement path. The first stop point is, for example, a front reversal point, in the feed direction, of the movement path. The linear path section to the second stop point can extend, for example, in the feed direction along a center axis between the two reversal points in the transverse direction of the two-dimensional movement path.

In a further development, the movement path forms a three-quarter circle with the second stop point as a circle center point. In this case, the first stop point typically forms a front reversal point of the periodic movement along the two-dimensional movement path. The use of a movement path in the form of a three-quarter circle has proven favorable for achieving a positive change in the interaction time between the machining beam and the material to be joined. In the case of the movement path in the form of a three-quarter circle, a non-continuous change in direction of the two-dimensional movement path typically takes place both in the first stop point and in the second stop point.

In another variation, the power of the machining beam is changed during the periodic movement along the movement path. It has proven advantageous if the periodic movement along the movement path is superimposed with a (position-dependent) control of the power of the machining beam, because it is thus possible to additionally respond to material-specific requirements for influencing the hot crack production and/or pore formation. The power of the machining beam in this case is typically reduced or restricted, starting from a maximal possible power, which provides a beam source, for example a laser beam source, for generating the machining beam. The maximal possible power can be, for example, a power in the order of magnitude of about 500 W to about 10 kW. The control of the power of the machining beam can, like the movement path, be realized symmetrically or asymmetrically with respect to the feed direction or to the center axis. In particular, a movement path which is symmetrical with respect to the center axis can have an asymmetrical power profile, or vice versa.

In a further development, the machining beam has a maximal power in the stop point. In other words, the power of the machining beam does not have a higher power at any other point along the two-dimensional movement path. In particular, the (maximal) power in the stop point can correspond to the maximal power which can be generated with the aid of the beam source. The introduction of the highest possible power at the stop point, which is typically located in the region of the joint center, enables a targeted introduction of heat in the region of the joint center, which typically has a positive effect on the welding result.

In a further development, the weld joint forms a fillet joint or a lap joint between the two workpieces to be joined. In contrast with butt joints, in which the two workpieces to be joined are aligned substantially parallel to one another, the force flow in the case of a fillet joint is strongly deflected. Possibly strong notch effects can therefore occur, which, especially in the case of dynamic loads, can have an unfavorable influence on the strength of the weld joint, which the method described here aims to prevent. In the case of a lap joint, the two workpieces to be welded are generally aligned parallel and overlap one another in the region of the weld joint. Welding errors can also occur in the case of a lap joint, for example in terms of the welding penetration depth, which can be reduced with the aid of the method described above, in particular in association with a positionally controlled power default value which can change along the movement path.

The disclosure also relates to a computer program product designed for carrying out all steps of the methods described herein when the computer program is run on a data processing system. A computer program can be written in any form of programming language, including compiled or interpreted languages, or declarative or procedural languages, and it can be deployed in any form, including as a standalone program or as a module, component, subroutine, or other unit suitable for use in a computing environment. The computer program product can be or include one or more modules of computer program instructions encoded on a tangible program carrier, for example a computer-readable medium, for execution by, or to control the operation of, a data processing system. The computer-readable medium can be a machine-readable storage device, a machine-readable storage substrate, a memory device, or a combination of one or more of them. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks.

The data processing system can be, for example, a control device of an apparatus for joining at least two workpieces, which is realized in the manner of a computer or the like. The computer program can comprise coded instructions to a movement device for moving a machining head and to a beam deflecting device for deflecting the machining beam so as to produce the movement of the machining beam and of the at least two workpieces relative to one another along the feed direction and the superimposed periodic movement along the movement path. The computer program can also comprise coded instructions to switch the laser beam on and off in order to start and stop the forming of the weld joint. The computer program including the coded instructions may be run on any suitable data processing device, e.g., a programmable processor such as a microprocessor, or special purpose logic circuitry, e.g., an FPGA (field programmable gate array) or an ASIC (application specific integrated circuit).

A further aspect of the disclosure relates to an apparatus of the type described herein, in which the control device is designed or programed for controlling the beam deflecting device for generating a preferably two-dimensional movement path, which has, between two reversal points in the transverse direction, at least one stop point at which a speed component of the periodic movement in the transverse direction is zero. A non-continuous change in direction of the two-dimensional movement path preferably takes place at the at least one stop point. A robot or the like, to which the machining head is attached, can serve, for example, as the movement device for moving the machining beam. The machining head can be moved relative to the, for example, stationary workpieces by means of the movement device in order to generate the relative movement in the feed direction (without the superimposed periodic movement). The superimposed periodic movement can be generated with the aid of the beam deflecting device, which can be designed for example as a scanner device, in particular as a laser scanner device.

In various embodiments, the beam deflecting device for deflecting the machining beam has at least two scanner mirrors. To execute a quick, oscillating movement along two mutually perpendicular axes or directions, it has proven favorable to use two separately controllable scanner mirrors. The axes of rotation of the two scanner mirrors can be aligned in particular perpendicularly to one another. By means of the movement device, e.g., in the form of a robot, the machining head can be rotated in such a way that the axis of rotation of one of the two scanner mirrors always runs parallel to the current feed direction, whilst the axis of rotation of the second scanner mirror is aligned in the transverse direction, i.e., perpendicularly to the feed direction. However, such an alignment of the axes of rotation and the use of two scanner mirrors is not absolutely required.

Further advantages of the invention are revealed in the description and the drawing. The features mentioned above, and those described below, can be applied individually or in groups in any combinations. The embodiments shown and described should not be seen as a definitive list, but are instead exemplary in nature for the purpose of describing the invention.

DESCRIPTION OF DRAWINGS

In these drawings, identical reference signs are used for identical or functionally identical components.

DETAILED DESCRIPTION

Figure 1:
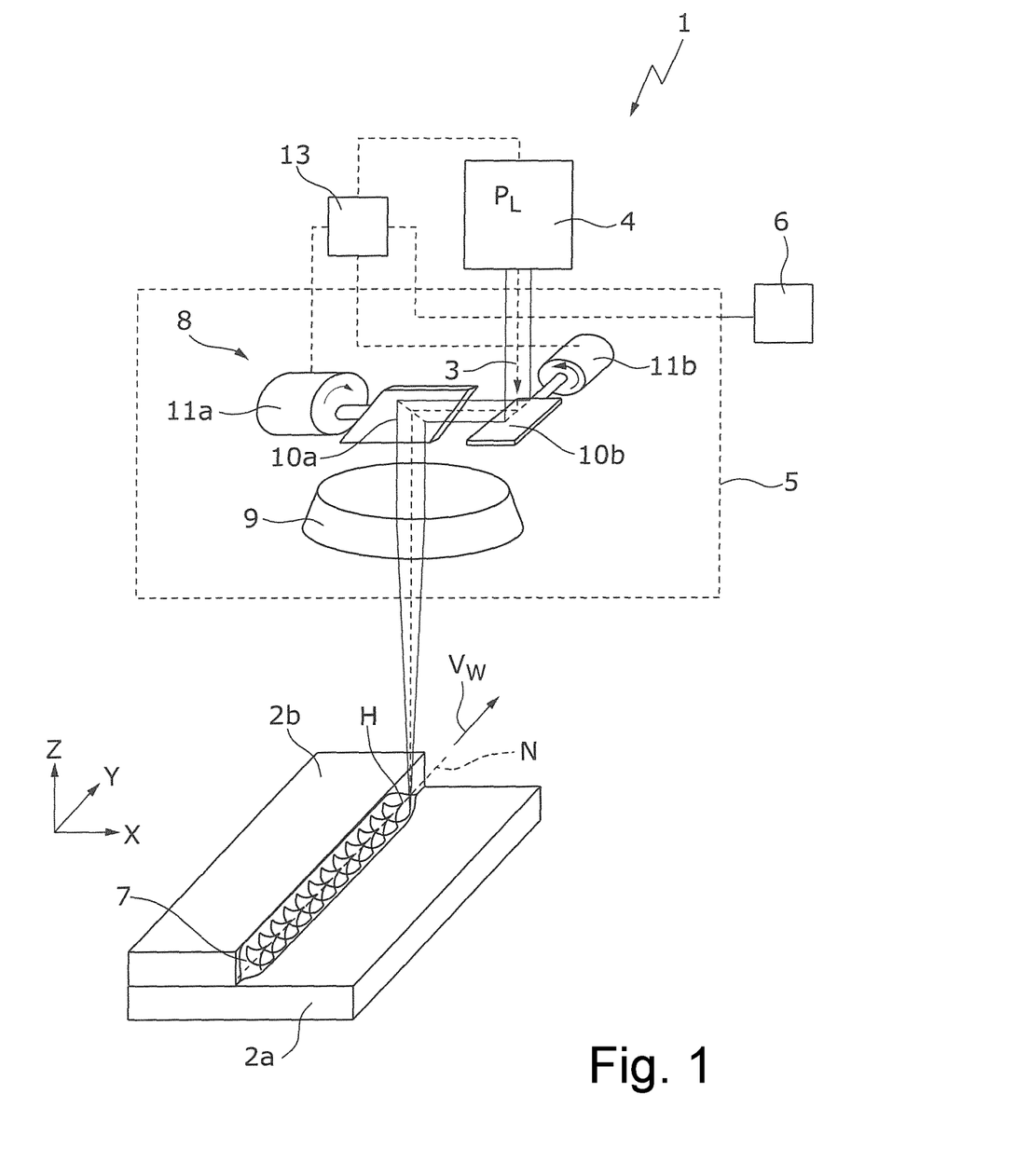
FIG. 1 is a schematic illustration of an embodiment of an apparatus for joining two workpieces, in which a laser machining head is moved in a feed direction and a laser beam is aligned with the two workpieces to form a weld joint.

FIG. 1 shows an example of a construction of an apparatus 1 for joining two workpieces 2a, 2b using a machining beam in the form of a laser beam 3. The apparatus 1 has, for generating the laser beam 3, a beam source in the form of a laser source 4, for example in the form of a solid-state laser, e.g., an Nd:YAG laser, a diode laser, or a fiber laser. In the example shown, the laser beam 3 is supplied with the aid of an optical fiber to a machining head 5, which aligns the laser beam 3 with the two workpieces 2a, b. In the example shown, the machining head 5 is moved by means of a movement device 6 relative to the two workpieces 2a,b to be joined, which are arranged stationary in the example shown. The movement device 6 can be, for example, a welding robot or the like, on which the machining head 5 is mounted. In the example shown in FIG. 1, the machining head 5 and therefore the laser beam 3 are moved in a feed direction Y corresponding to the Y direction of an XYZ coordinate system with a feed speed $V_W$. Alternatively, the machining head 5 may be mounted to a coordinate guide and moved relative to the stationary workpieces 2a, 2b using translatory drives, e.g., linear actuators and/or motors. Alternatively or in addition, the workpieces 2a, 2b may be moved along the Y direction using, e.g., linear actuators and/or motors.

In the example shown in FIG. 1, a weld joint 7 in the form of a so-called fillet joint is formed by means of the laser beam 3 focused on the two workpieces 2a, 2b during the movement in the feed direction Y. It has been shown in the case of such fillet joints, but also in the case of lap joints, that cracks can form along the weld joint 7 with the movement of the laser beam 3 in the (constant) feed direction Y, in particular when the two workpieces 2a,b are formed from materials which are susceptible to hot cracking or when mixed compounds of combinations of certain workpiece materials are to be welded together. To prevent the formation of hot cracks wherever possible, the (in the example shown, linear) movement in the feed direction Y is superimposed with a periodic movement of the laser beam 3, as will be described in more detail below.

In the example shown in FIG. 1, the machining head 5 has a beam deflecting device in the form of a scanner device 8, which comprises a first and second scanner mirror 10a, 10b. By means of associated rotary drives 11a, 11b, the two scanner mirrors 10a, 10b are rotatable about two axes of rotation which, in the example shown, correspond to the X direction and to the Y direction of the XYZ coordinate system. An objective 9 follows the scanner device 8 in the beam path, which objective additionally carries out focusing of the laser beam 3 in order to focus the laser beam 3 deflected by the scanner device 8 in the region of the weld joint 7. During the formation of a weld joint 7 in the form of the fillet joint shown in FIG. 1, the laser beam 3 is aligned in a manner which differs from that illustrated in FIG. 1; generally not perpendicularly, but at an angle to the Z direction in relation to the two workpieces 2a, 2b, for example as described in DE 10 2013 219 220 A1 cited at the outset, which is incorporated by reference in the content of this application in its entirety.

The apparatus 1 also has a control device 13 for controlling the scanner device 8, more precisely the rotary drives 11a, 11b of the two scanner mirrors 10a, 10b, and for controlling the movement device 6. The control device 13 also serves for controlling the laser source 4, in particular for controlling a (current) laser power $P_L$ of the laser source 4.

The control device 13 is designed or programed to control the rotary drives 11a, 11b in such a way that the two scanner mirrors 10a, 10b are rotated about the respective axis of rotation X, Y such that, as a result of the movement of the machining head 5, the movement of the laser beam 3 in the feed direction Y is superimposed with an additional periodic (oscillating) movement. Alternatively, the scanner device 8 may have only a single mirror that can be rotated about the two axes of rotation X, Y.

Figure 2A:
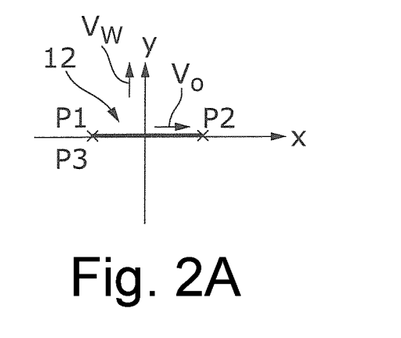
FIGS. 2A and 2B area position graph and a time/speed graph of a periodic movement of the laser beam, superimposed on the movement in the feed direction, along a one-dimensional movement path in a transverse direction perpendicularly to the feed direction.

An example of a periodic movement that progresses along a one-dimensional movement path 12 extending in a transverse direction X perpendicularly to the feed direction Y is illustrated in FIG. 2A. As can be seen in FIG. 2A, the laser beam 3 on the movement path 12 executes an oscillating movement exclusively in the transverse direction X. The closed movement path 12 of the laser beam 3 is generated by the beam deflecting device 8, wherein, in FIG. 2A, the movement in the feed direction Y has not been taken into account. The movement path 12 leads from a first point P1 (shown in FIG. 2A), which represents a first reversal point of the periodic movement in the transverse direction X, via a second point P2, which represents a second reversal point of the periodic movement in the transverse direction X, back to a point P3, the position of which corresponds to the first point P1.

Figure 2B:
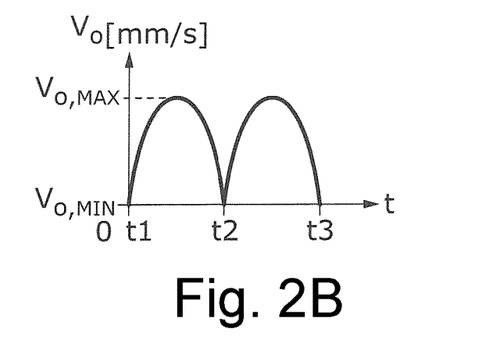

FIG. 2B shows the oscillating speed $V_o$ of the second scanner mirror 10b, which brings about the movement in the transverse direction X perpendicularly to the feed direction Y, wherein the three points in time $t_1, t_2, t_3$ shown in FIG. 2B correspond to the three points P1, P2, P3, shown in FIG. 2A, along the movement path 12. As can be seen in FIG. 2B, the oscillating speed $V_o$ in the example shown varies between a maximal oscillating speed $V_{o,MAX}$ and a minimal oscillating speed $V_{o,MIN}=0$, which is reached at the respective reversal points P1 to P3. $V_W$ is the feed speed of the relative movement in the feed direction Y that is superimposed with the periodic movement/trajectory as shown in FIG. 2A.

Figures 3A, 3B:
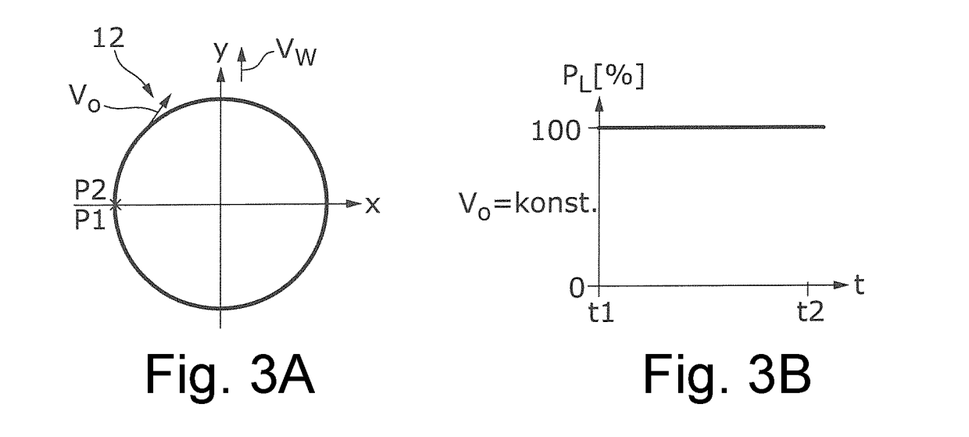
FIGS. 3A and 3B area position graph and a time-dependent laser power during a periodic movement of the laser beam along a two-dimensional, circular movement path.

FIGS. 3A and 3B shows an example of a periodic movement, in which the laser beam 3 progresses along a two-dimensional circular movement path 12. In the circular movement path 12, the direction of the (vectorial) oscillating speed $V_o$ changes continuously and depending on the position, whilst the absolute value $V_o$ (illustrated in FIG. 3B) of the oscillating speed $V_o$ remains constant. The power $P_L$ of the laser source 4 also remains constant in the example shown in FIG. 3B and corresponds to the maximal possible laser power (i.e., $P_L=100\%$).

The inventors have recognized that, in terms of the formation of hot cracks along the weld joint 7, optimal results cannot be achieved with the linear or, in the position/time graph, sinusoidal movement path 12 shown respectively in FIGS. 2A and 2B and with the circular movement path 12 shown in FIGS. 3A and 3B.

Figure 4A:
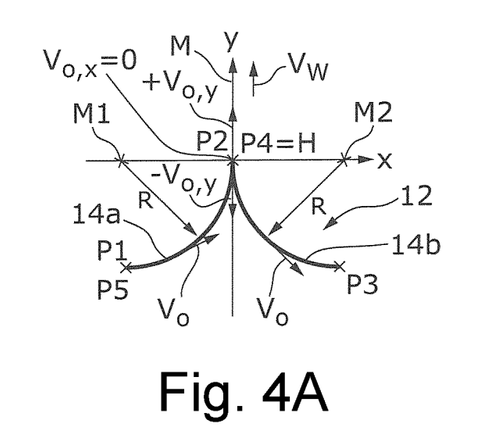
FIGS. 4A and 4B are graphs analogous to the graphs in FIGS. 3A and 3B, of a movement path that has two circular-arc-shaped path sections, which meet at a stop point at which a speed component of the periodic movement in the transverse direction is zero.

In contrast, the formation of hot cracks at the fillet joint 7 can be reduced considerably when the superimposed periodic movement of the laser beam 3 takes place along a closed movement path 12 that has at least one stop point H as illustrated, for example, in FIG. 4A. The movement path 12 shown in FIG. 4A progresses symmetrically in the transverse direction X with respect to a center axis M, which contains the stop point H and, in the example shown, corresponds to the Y axis along which the feed motion takes place. The center axis M shown in FIG. 4A corresponds to the joint center N of the weld joint 7 shown in FIG. 1, i.e., the deflection (shown in FIG. 4A) of the movement path 12 takes place in the (positive and negative) X direction or in the transverse direction X, starting from the joint center N of the weld joint 7.

In FIG. 4A, five points P1 to P5 are illustrated, which each form a reversal point of the periodic movement along the two-dimensional movement path 12. Starting from a first point P1, which forms a left reversal point of the periodic movement in the transverse direction X, the movement path 12 progresses in the direction of the center axis M along a first circular arc 14a in the form of a quarter circle with a first circle center point M1. The first circular arc 14a ends on the center axis M at the second point P2, which corresponds to the stop point H. The second point P2 or the stop point H forms a front reversal point, in the feed direction Y, of the periodic movement along the movement path 12.

Starting from the stop point H, the movement path 12 progresses along a second circular arc 14b with a second center point M2, which likewise forms a quarter circle symmetrically with respect to the center axis M, to a third point P3, which forms a right reversal point of the movement path 12 in the transverse direction X. The circle center point M2 of the second circular arc 14b is likewise located on the X axis and the X position thereof corresponds to the X position of the third point P3 along the movement path 12. The radius R of the two circular path sections 14a, 14b can be in the order of magnitude of about 0.1 mm to about 2.5 mm, e.g., about 0.5 mm.

In the case of the movement path 12 shown in FIG. 4A, a movement reversal with a non-continuous change in direction takes place at the stop point H, i.e., the movement path 12 has a kink at the stop point H. Accordingly, the oscillating speed $V_O$, more precisely the speed component $V_{O,Y}$ thereof in the feed direction Y, exhibits a discontinuity—during the movement of the laser beam 3 along the first circular-arc-shaped path section 14a towards the stop point H, the movement path 12 has a speed component $V_{O,Y}$ in the feed direction Y with a positive sign ($+V_{O,Y}$). During the path movement of the laser beam 3 starting from the stop point H along the second circular-arc-shaped path section 14b, the speed component in the feed direction Y has a negative sign (but an identical absolute value) ($-V_{O,Y}$).

In the case of the movement path 12 shown in FIG. 4A, the stop point H is passed through a second time (from right to left) (point P4), wherein the signs of the speed components $V_{O,Y}$ in the Y direction reverse accordingly. As can likewise be seen in FIG. 4A, the two circular-arc-shaped path sections 14a, 14b, when reaching the stop point H, exclusively have a speed component $-V_{O,Y}$ or $+V_{O,Y}$ in the feed direction Y, but a vanishing speed component $V_{O,X}$ in the X direction, since the tangent of the two circular-arc-shaped path sections 14a, 14b and therefore the speed vector $V_o$ at the stop point H points in the Y direction.

Figure 4B:
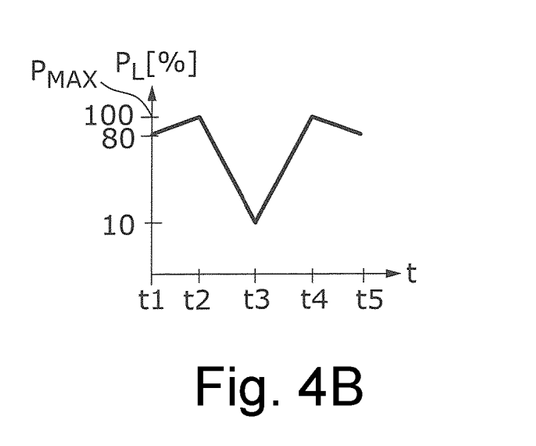

FIG. 4B shows the time-dependence of the laser power $P_L$ (in % of the maximal laser power) during the movement of the laser beam 3 along the movement path 12 of FIG. 4A. As can be seen in FIG. 4B, the laser power $P_L$ is maximal (100%) in the stop point H, which is, for example, in the order or magnitude of about 5 kW, and minimal in the right reversal point P3, whilst the laser power $P_L$ drops to 80% of the maximal value at the left reversal point P1 or P5. The power profile of the laser power $P_L$ is therefore asymmetrical with respect to the center axis M, although the movement path 12 itself runs symmetrically with respect to the center axis M. A profile of the laser power $P_L$ which is asymmetrical with respect to the center axis M is advantageous, for example, when welding a fillet joint since, in this case, more workpiece material has to be melted on one side of the center axis M than on the other side.

Figure 5A:
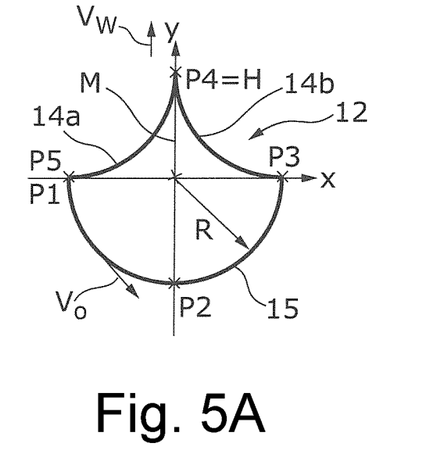
FIGS. 5A and 5B are graphs analogous to the graphs in FIGS. 4A and 4B, in which the movement path additionally has a semi-circular path section, which connects the two circular-arc-shaped path sections.

FIG. 5A shows a position graph of a two-dimensional movement path 12, which differs from the movement path 12 shown in FIG. 4A in that the two end points P1, P3 of the circular-arc-shaped path sections 14a, 14b are connected to one another by a semicircular path section 15, which, starting from the end points P1, P3, extends counter to the feed direction Y, i.e., in the negative Y direction, to a rear reversal point P2 of the movement path 12 in the feed direction Y. The radius R of the semicircular path section 15 corresponds to the radius R of the two circular-arc-shaped path sections 14a, 14b of the movement path 12 and, in the example shown, is about R=0.5 mm. It has been shown that, in the case of the movement path 12 shown in FIG. 5A, with certain material combinations, an improved welding result can be achieved when compared to the movement path 12 shown in FIG. 4A. FIG. 1 shows the movement of the laser beam 3 along the weld joint 7, which is composed of the movement in the feed direction (at the feed speed $V_w$) and the superimposed periodic movement along the movement path 12 shown in FIG. 5A, and the stop point H.

Figure 5B:
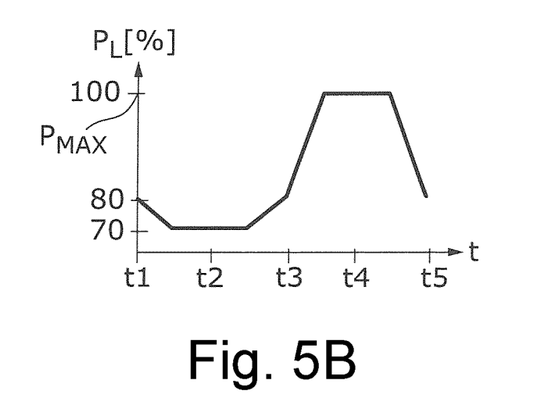

Analogously to FIG. 4B, FIG. 5B shows the time-dependent varying power $P_L$ of the laser beam 3 during the movement along the movement path 12 of FIG. 5A. As can be seen in FIG. 5B, the laser power $P_L$ is maximal (100%) in the stop point H (corresponding to P4 or $t_4$) and minimal (about 70%) in the rear reversal point P2 in the feed direction Y, whilst the laser power $P_L$ is at 80% of the maximal value $P_{MAX}$ at the left and at the right reversal point P1 or P3. Between the points in time $t_1$, $t_3$ at which the reversal points P1, P3 are reached in the transverse direction X, the power $P_L$ is reduced to the minimal value of the power $P_L$ at the point in time $t_2$, corresponding to the rear reversal point P2 in the feed direction Y, and increased, linearly in the manner of a ramp. Accordingly, the power $P_L$ is also increased to the maximal power $P_{MAX}$, and reduced, in the manner of a ramp between the point in time $t_3$ and the point in time $t_5$, which correspond to the two reversal points P3, P5 in the transverse direction X.

Figure 6A:
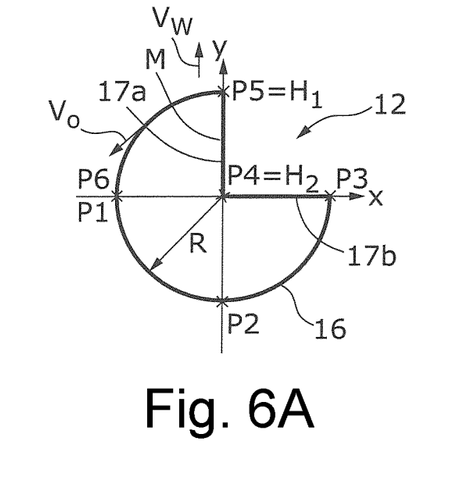
FIGS. 6A and 6B are graphs analogous to the graphs of FIGS. 3A and 3B, in which the movement path forms a three-quarter circle with two stop points.

FIG. 6A shows a two-dimensional movement path 12 which, unlike the movement paths 12 shown in FIG. 4A and in FIG. 5A, does not run symmetrically with respect to the center axis M, which corresponds to the joint center N of the weld joint 7. The two-dimensional movement path 12 shown in FIG. 6A forms a three-quarter circle, i.e., it has a circular-arc-shaped path section 16 and two linear path sections 17a, 17b, which start from a circle center point P4 and, starting from the circle center point P4, extend in the X direction or in the Y direction to the two end points P1, P3 of the circular-arc-shaped path section 16.

The path curve 12 shown in FIG. 6A has a first stop point H1 and a second stop point H2 along the center axis M. As in the case of the movement paths 12 shown in FIG. 4A and in FIG. 5A, the first stop point H1 forms a front reversal point P5 in the feed direction Y of the periodic movement, wherein a non-continuous change in direction of the two-dimensional movement path 12 takes place at the first stop point H1. A non-continuous change in direction of the movement path 12 in the form of a change in direction through 90° also takes place at the second stop point H2, which is connected to the first stop point H1 via the linear path section 17a extending in the feed direction Y. The speed component $V_{O,X}$ of the periodic movement in the transverse direction X is zero along the entire path section 17a of the movement path 12, which extends in the feed direction Y and therefore also at the two stop points H1, H2. In the case of the linear path section 17b extending in the transverse direction X, the speed component $V_{O,Y}$ of the movement path 12 in the feed direction Y is accordingly zero. It has been shown that the movement path 12 shown in FIG. 6A has also been shown to be advantageous with certain material combinations of the workpieces 2a, 2b to be joined, for example for fillet joint welds in aluminum alloys which are susceptible to hot cracking.

Figure 6B:
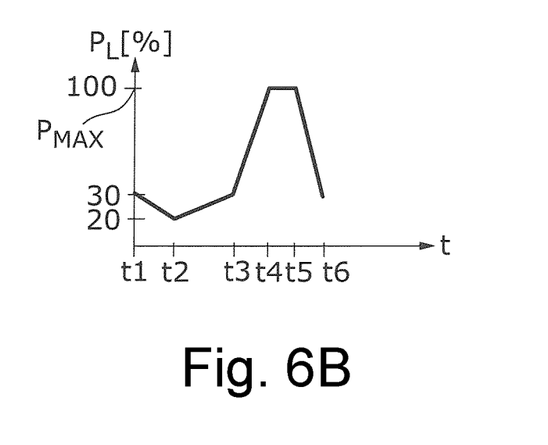

FIG. 6B shows the time-dependent power $P_L$ of the laser beam 3, wherein the points in time $t_1$ to $t_6$ correspond to the points P1 to P6 along the movement path 12 shown in FIG. 6A. As can likewise be seen in FIG. 6B, the power $P_L$ has a maximal value $P_{MAX}$ at the two stop points H1, H2 and along the linear path section 17a between the two stop points H1, H2. The power $P_L$ drops to a minimal value of 20% at the rear point P2, in the feed direction Y, of the movement path 12 and has a value of 30% at the two reversal points P1, P3 in the transverse direction X, wherein the power $P_L$ increases linearly or drops linearly between these points (i.e., P1 and P2 or P2 and P3) in each case. The profile of the power $P_L$ shown in FIG. 6B has likewise proven favorable for influencing the welding process.

In summary, a targeted influence of the molten volume can be achieved in the manner described above, in particular when welding fillet joints, but also when welding lap joints or when welding other joint geometries. In particular, an improvement in the connection between the workpieces 2a, 2b forming the partners to be joined can be achieved, because the connection is less susceptible to the formation of hot cracks. The material of the workpieces 2a, 2b can be, for example, aluminum or an aluminum alloy, as is used, for example, for vehicle body components.

Other Embodiments

The methods described herein can be advantageously used not only for the fillet joint 7 shown in FIG. 1, but also for other weld joints, for example for lap joints, for example, when welding is to take place along a weld joint in the region in which the two workpieces 2a, 2b shown in FIG. 1 overlap. The methods described herein can also be used, for example, for improving the connection between two workpieces 2a, 2b made from different materials, which can otherwise generally not be readily connected by a laser welding method, for example copper and aluminum.

Instead of a machining beam in the form of a laser beam, it is optionally possible for another type of high-energy beam, for example, a plasma beam, to be used for carrying out the welding procedure.

What is claimed is:

1. A method for joining at least two workpieces, the method comprising:
    forming a weld joint by moving a machining beam relative to the at least two workpieces along a feed direction,
    wherein the movement of the machining beam relative to the two workpieces is superimposed with a periodic movement in a movement path that extends in a transverse direction perpendicularly to the feed direction,
    wherein the movement path is a two-dimensional movement path that additionally extends along the feed direction,
    wherein the movement path between two reversal points in the transverse direction has at least one stop point at which a speed component of the periodic movement in the transverse direction is zero, and
    wherein the two-dimensional movement path has two arced path sections, which contact one another at the at least one stop point, wherein the two arced path sections, upon reaching the at least one stop point, have a speed vector tangential to the feed direction.

2. The method of claim 1, wherein a non-continuous change in direction of the two-dimensional movement path takes place at the at least one stop point.

3. The method of claim 1, wherein the at least one stop point of the periodic movement is positioned along a joint center of the weld joint.

4. The method of claim 1, wherein the at least one stop point forms a front reversal point, in the feed direction, of the periodic movement along the two-dimensional movement path.

5. The method of claim 1, wherein the movement path has a further arced path section, which connects two end points, remote from the at least one stop point, of the two arced path sections to one another.

6. The method of claim 1, wherein the two-dimensional movement path in the transverse direction progresses symmetrically or asymmetrically with respect to a center axis progressing in the feed direction, containing the at least one stop point.

7. The method of claim 1, wherein the power of the machining beam is changed during the periodic movement along the movement path.

8. The method of claim 7, wherein the machining beam has a maximal power at the at least one stop point.

9. The method of claim 1, wherein the weld joint forms a fillet joint or a lap joint between the two workpieces to be joined.

10. The method of claim 1, wherein the machining beam is a laser beam.

11. A tangible computer-readable medium storing instructions that, when executed by a data processing system, cause the data processing system to carry out the steps of the method of claim 1.

12. The method of claim 1, wherein the two arced path sections each form a quarter circle.

13. A system for joining at least two workpieces, comprising:
    a machining head for aligning a machining beam with the two workpieces;
    a movement device for moving the machining beam relative to the at least two workpieces in a feed direction to form a weld joint;
    a beam deflecting device for deflecting the machining beam; and
    a control device for controlling one or both of the beam deflecting device and the movement device to generate a periodic movement of the machining beam, superimposed on the relative movement between the machining beam and the two workpieces in the feed direction, along a movement path that extends in a transverse direction perpendicularly to the feed direction, wherein the movement path is a two-dimensional movement path that additionally extends along the feed direction;
    wherein the control device for controlling the beam deflecting device is configured to generate a movement path, which has, between two reversal points in the transverse direction, at least one stop point at which a speed component of the periodic movement in the transverse direction is zero, and
    wherein the two-dimensional movement path has two arced path sections, which contact one another at the at least one stop point, wherein the two arced path sections, upon reaching the at least one stop point, have a speed vector tangential to the feed direction.

14. The system of claim 13, wherein a non-continuous change in direction of the two-dimensional movement path takes place at the at least one stop point.

15. The system of claim 13, wherein the beam deflecting device comprises at least two scanner mirrors for deflecting the machining beam.

16. The system of claim 13, wherein the machining beam comprises a laser beam.

17. The system of claim 13, wherein the two arced path sections each form a quarter circle.

18. A method for joining at least two workpieces, the method comprising:
- forming a weld joint by moving a machining beam relative to the at least two workpieces along a feed direction,
- wherein the movement of the machining beam relative to the two workpieces is superimposed with a periodic movement in a movement path that extends in a transverse direction perpendicularly to the feed direction,
- wherein the movement path is a two-dimensional movement path that additionally extends along the feed direction,
- wherein a portion of the two-dimensional movement path between two reversal points in the transverse direction has at least one stop point at which a speed component of the periodic movement in the transverse direction is zero,
- wherein the two-dimensional movement path has a first stop point and a second stop point, wherein the first stop point forms a reversal point in the feed direction of the periodic movement along the two-dimensional movement path, and wherein the second stop point is connected to the first stop point by a linear path section, and
- wherein the movement path forms a three-quarter circle with the second stop point as a circle center point.

* * * * *